US008484216B2

(12) United States Patent
Berry et al.

(10) Patent No.: US 8,484,216 B2
(45) Date of Patent: *Jul. 9, 2013

(54) CONVERSATION PERSISTENCE IN REAL-TIME COLLABORATION SYSTEM

(75) Inventors: Richard Edmond Berry, Georgetown, TX (US); Yen-Fu Chen, Austin, TX (US); John Hans Handy-Bosma, Cedar Park, TX (US); Peter Y. Hsu, Austin, TX (US); Mei Y. Selvage, Austin, TX (US); Alan R. Tannenbaum, Austin, TX (US); Anthony C. Courtney Temple, Northants (GB); Keith Raymond Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/198,119

(22) Filed: Aug. 4, 2011

(65) Prior Publication Data

US 2011/0289429 A1 Nov. 24, 2011

Related U.S. Application Data

(63) Continuation of application No. 12/335,963, filed on Dec. 16, 2008, now Pat. No. 8,001,126, which is a continuation of application No. 11/032,848, filed on Jan. 11, 2005, now Pat. No. 7,483,899.

(51) Int. Cl.
*G06F 17/30* (2006.01)

(52) U.S. Cl.
USPC .......................... 707/737; 709/204; 715/758

(58) Field of Classification Search
USPC ...... 707/737, 999.01, 999.104; 709/206–207, 709/204; 715/758
See application file for complete search history.

(56) References Cited

U.S. PATENT DOCUMENTS

| 5,442,742 | A | 8/1995 | Greyson et al. |
| 6,279,017 | B1 | 8/2001 | Walker |
| 6,301,609 | B1 | 10/2001 | Aravamudan |
| 6,484,196 | B1 * | 11/2002 | Maurille ................ 709/206 |
| 6,532,218 | B1 | 3/2003 | Shaffer |
| 6,557,027 | B1 | 4/2003 | Cragun |

(Continued)

OTHER PUBLICATIONS

USPTO; Examination Correspondence from a Related U.S. Appl. No. 11/039,732, filed Jan. 20, 2005 by Yen Fu Chen.

(Continued)

*Primary Examiner* — Leslie Wong
(74) *Attorney, Agent, or Firm* — Robert H. Frantz; David A. Mims, Jr.; Arthur J. Samodovitz

(57) ABSTRACT

Previously conducted conversations in real-time collaboration messages are persistently stored, either by client or a server, and then are associated with conversational items presented to a user (e.g. contact names, topics, etc.). An icon is provided near each listed item, which when selected, displays to the user summaries or titles of all transcripts to which the selected item pertains or relates. The user may select one or more summaries or titles for which the conversation is to be resumed, causing the system to retrieve the stored transcript and resume appending new conversational entries to it, so that the user recovers conversational context effortlessly and accurately. Enhanced versions of the invention include sharing of transcripts so that all participants receive the context of the conversation, and server-side or client-side implementations.

19 Claims, 12 Drawing Sheets

U.S. PATENT DOCUMENTS

| | | | |
|---|---|---|---|
| 6,651,086 B1 | 11/2003 | Manber | |
| 6,683,631 B2 | 1/2004 | Carroll | |
| 6,760,580 B2 | 7/2004 | Robinson et al. | |
| 6,760,749 B1 | 7/2004 | Dunlap | |
| 6,772,195 B1 | 8/2004 | Hatlelid et al. | |
| 7,024,456 B1 | 4/2006 | Simonoff | |
| 7,124,164 B1 | 10/2006 | Chemtob | |
| 7,124,167 B1 | 10/2006 | Bellotti et al. | |
| 7,191,400 B1 | 3/2007 | Buvac | |
| 7,263,526 B1 | 8/2007 | Busey | |
| 7,292,870 B2 | 11/2007 | Heredia et al. | |
| 7,328,214 B2 | 2/2008 | Yuan | |
| 7,328,242 B1 * | 2/2008 | McCarthy et al. | 709/204 |
| 7,478,334 B2 | 1/2009 | Chen | |
| 7,483,899 B2 | 1/2009 | Berry et al. | |
| 7,559,021 B2 | 7/2009 | Chen | |
| 7,596,596 B2 | 9/2009 | Chen | |
| 7,613,773 B2 | 11/2009 | Watt | |
| 7,779,067 B2 * | 8/2010 | Beck et al. | 709/203 |
| 8,001,126 B2 | 8/2011 | Berry | |
| 8,015,497 B2 | 9/2011 | Chen | |
| 2001/0033298 A1 | 10/2001 | Slotznick | |
| 2002/0035605 A1 | 3/2002 | McDowell | |
| 2002/0112004 A1 | 8/2002 | Reid | |
| 2002/0120939 A1 | 8/2002 | Wall | |
| 2002/0178246 A1 | 11/2002 | Mayer | |
| 2003/0034999 A1 | 2/2003 | Coughlin | |
| 2003/0074552 A1 | 4/2003 | Olkin et al. | |
| 2003/0126139 A1 | 7/2003 | Lee et al. | |
| 2003/0225846 A1 | 12/2003 | Heinkes et al. | |
| 2003/0229845 A1 | 12/2003 | Salesin et al. | |
| 2004/0002049 A1 | 1/2004 | Beavers | |
| 2004/0015547 A1 | 1/2004 | Griffin et al. | |
| 2004/0015553 A1 | 1/2004 | Griffin et al. | |
| 2004/0037406 A1 | 2/2004 | Gourraud | |
| 2004/0049543 A1 | 3/2004 | Kaminsky et al. | |
| 2004/0078432 A1 | 4/2004 | Manber et al. | |
| 2004/0078435 A1 | 4/2004 | Dunbar et al. | |
| 2004/0109023 A1 | 6/2004 | Tsuchiya | |
| 2004/0119740 A1 | 6/2004 | Chang et al. | |
| 2004/0151323 A1 | 8/2004 | Olkin et al. | |
| 2004/0243922 A1 | 12/2004 | Sirota | |
| 2005/0024387 A1 | 2/2005 | Ratnakar | |
| 2005/0043060 A1 | 2/2005 | Brandenberg et al. | |
| 2005/0097440 A1 | 5/2005 | Lusk et al. | |
| 2005/0097470 A1 | 5/2005 | Dias | |
| 2005/0102361 A1 | 5/2005 | Winjum | |
| 2005/0102628 A1 | 5/2005 | Salesin et al. | |
| 2005/0108332 A1 | 5/2005 | Vaschillo | |
| 2005/0216639 A1 | 9/2005 | Sparer et al. | |
| 2005/0289220 A1 | 12/2005 | Chen | |
| 2006/0004703 A1 | 1/2006 | Spivack et al. | |
| 2006/0026147 A1 | 2/2006 | Cone et al. | |
| 2006/0053194 A1 | 3/2006 | Schneider et al. | |
| 2006/0059235 A1 * | 3/2006 | Peterson et al. | 709/206 |
| 2006/0155785 A1 | 7/2006 | Berry et al. | |
| 2006/0161842 A1 | 7/2006 | Chen | |
| 2006/0161851 A1 | 7/2006 | Chen et al. | |
| 2006/0168026 A1 | 7/2006 | Keohane | |
| 2006/0212519 A1 | 9/2006 | Kelley et al. | |
| 2009/0089686 A1 | 4/2009 | Chen | |
| 2009/0094288 A1 | 4/2009 | Berry | |

OTHER PUBLICATIONS

William Wright and Dana Moore, "Instant Messaging a Programmer's Tool? Jabber and lightweight languages do the trick," Dr. Dobb's Journal, pp. 48-53, Mar. 2004.

Kinzie, Mable B., "Instructional Uses of Instant Messaging (IM) During Classroom Lectures", Educational Technology & Society, 8 (2), pp. 150-160, Retrieved on Feb. 1, 2008 from http://www.ifets.info/journals/8_2/14.pdf.

USPTO; Examination correspondence from related U.S. Appl. No. 11/032,848, filed Jan. 11, 2005 by Richard Berry.

USPTO; Examination correspondence from related U.S. Appl. No. 12/335,963, filed Dec. 15, 2008 by Richard Berry.

USPTO; Examination Correspondence from a Related U.S. Appl. No. 11/039,532, filed Jan. 20, 2005 by Yen-Fu Chen.

USPTO; Examination Correspondence from a Related U.S. Appl. No. 12/329,123, filed Dec. 5, 2008 by Yen Fu Chen.

USPTO; Examination Correspondence from a Related U.S. Appl. No. 10/875,881, filed Jun. 24, 2004 by Yen Fu Chen.

* cited by examiner

US 8,484,216 B2

CONVERSATION PERSISTENCE IN REAL-TIME COLLABORATION SYSTEM

CROSS-REFERENCE TO RELATED APPLICATIONS (CLAIMING BENEFIT UNDER 35 U.S.C. 120)

This patent application is a continuation of U.S. patent application Ser. No. 12/335,963, filed on Dec. 16, 2008 by Richard Edmond Berry, currently awaiting issuance, which was a continuation application of U.S. patent application Ser. No. 11/032,848, filed on Jan. 11, 2005, by Richard Edmond Berry, now issued as U.S. Pat. No. 7,483,899.

FEDERALLY SPONSORED RESEARCH AND DEVELOPMENT STATEMENT

This invention was not developed in conjunction with any Federally-sponsored contract.

MICROFICHE APPENDIX

Not applicable.

INCORPORATION BY REFERENCE

None.

BACKGROUND OF THE INVENTION

1. Field of the Invention

This invention relates to real-time messaging technologies, user interfaces for such technologies, and the ability to recall and share previously conducted conversations.

2. Background of the Invention

Real-time collaboration tools such as IBM's Same Time, MSN's Messenger, Yahoo! Messenger, and AOL Instant Messenger ("IM")™ segment conversations by assigning break points to signify the end of conversations. Methods used to determine a break point in the thread of conversation include one or more of the following:

(a) user interface or chat window closure;
(b) logoff of the user from the messaging service;
(c) exiting the messaging client program; and
(d) shutting down the client system's operating system or turning off the client device.

These break points affect both the logged transcript of the conversation held between the conversants and, perhaps more importantly, what happens when communications between the same conversants is resumed after the break point is set.

For example, after a messaging session between a first, a second and a third user, a break point is set when the first user closes his or her client messaging window. Upon resuming conversation by the first user with the second or third user, or with both, the messaging log shows a new conversation and, more importantly, the previous entries from the previously concluded conversation are not displayed.

If the first user wishes to refresh his or her memory as to what was said during the previously concluded conversation, or where the thoughts ended during the conversation, he or she must find and review transcripts of many previously completed "chats", or more often, he or she will ask the other conversants questions about what was said during the previous conversation. This may require several exchanges between the conversants to establish a "context" of the conversation, and, depending on the accuracy of the memories of the other conversants, may lead to repeating subjects or inaccurately recalling previous discussions. Often, this is very frustrating to the participants as well.

This limitation of the known real-time messaging technology limits the effectiveness of the tools. A fundamental flaw with automatically assigning break points in real-time conversation transcripts is that a conversation may not be over just because the user closes a window, shuts down their computer, etc. These events are only logically associated with the end of a logical conversation in some situations, but not always and not reliably.

Now consider another example which illustrates the same problem:

(1) a first user closes his or her messaging client user interface window, which terminates the transcript on the first user's client device;
(2) perhaps 45 minutes later, the first user restarts his or her messaging client and is ready to receive messages, albeit the messaging client has started a new conversation transcript;
(3) another participant in the original conversation of (1) sends an entry related to the original conversation, but after the first user has restarted his or her messaging client; and
(4) the new entry is received by the first user but displayed in the context of the new conversation, out of context with the original conversation.

In this scenario, which is not uncommon, the first user has mentally lost the context of the original conversation, especially if other conversations with other conversants or about other subjects were conducted during the meantime.

Consider another example, similar to the previous example, but in a situation where one conversant sends a message to another, but then has to shut down or reboot his or her messaging device. The recipient of the question replies "Sure" or "Sounds OK to me", but this message is not received until the originator of the question reboots the messaging client. Unfortunately, when the reply is received by the first user, the message arrives out of context, and it is unclear to the first user what the question was.

Some conversations, even though the short term exchanges are made in real-time, actually evolve and develop over hours or even days, as some of the participants are drawn away for other matters, or some of the questions posed require time to consider or research, etc. This situation, which is also very common, leaves all users with fragments of conversation threads, none of which can be easily reconstructed into a single context of conversation.

Current solutions to help deal with this problem are manual. A user may try to keep chat windows open as long as possible, they may look up and visually search through many previous chat transcripts, they may ask other participants for context reminders, or they may rely on their best memory of what was discussed. In all of these solutions, the accuracy of the context recall is less than desired, the process may be frustrating, and much of the benefit of real-time communications is lost on inefficiency of context recollection.

BRIEF DESCRIPTION OF THE DRAWINGS

The following detailed description when taken in conjunction with the figures presented herein present a complete description of the present invention.

SUMMARY OF THE INVENTION

The present invention implements a new model to establish persistent conversation contexts in a real-time collaboration tool which allows user or the system to define what, when, and under what conditions conversation break points are entered in transcripts according to user-defined preferences. With the present invention, real-time messaging service users can start or stop a conversation anytime they choose, without loosing the continuation of threads conversation, and without losing valuable context of the discussion.

According to one aspect of the present invention, users are allowed to specify under what conditions for a messaging client to insert break points into, terminate or originate transcripts.

According to another aspect of the present invention, the system automatically recalls previously stored transcripts, displays them and appends new entries into them according to user preferences and controls.

According to yet another aspect of the present invention, a new user interface is provided to allow users to quickly review previously stored transcripts, sort and organize them, and select which conversations to resume.

DETAILED DESCRIPTION OF THE INVENTION

The present invention may be realized as a software product, in addition to or extension to other software products such as the instant or real-time message products previously discussed, and especially in conjunction with IBM Lotus SameTime™ product. However, it will be recognized by those skilled in the art that alternate embodiments of the invention may include other messaging clients, servers, systems, and hardware without departing from the scope of the invention.

Therefore, it is useful to first review the generalities of computing platforms upon which or within which such messaging services may be performed or provided to users.

Computing Platform Suitable for Realization of the Invention

Figure 1:
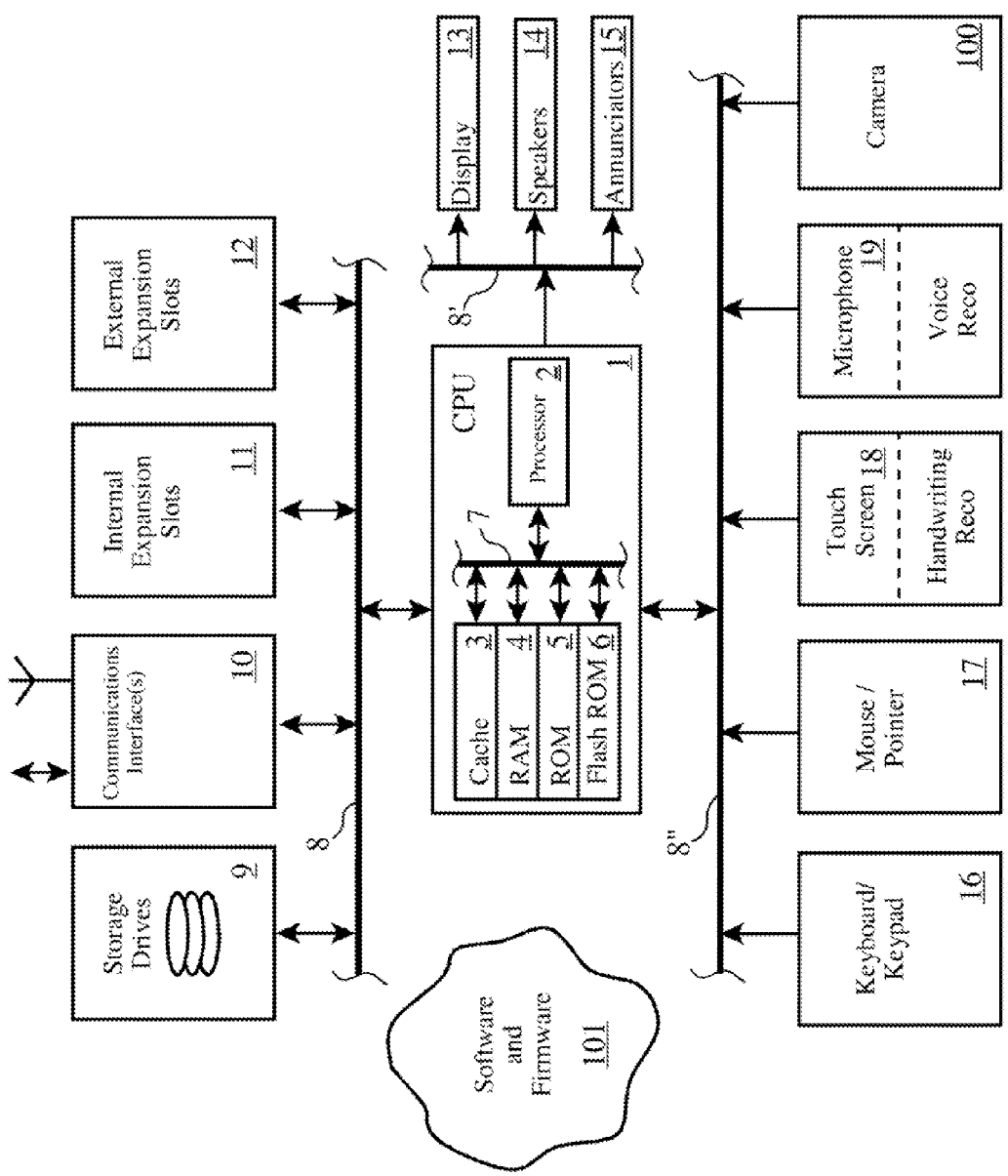
FIG. 1 depicts a generalized computing platform architecture, such as a personal computer, server computer, personal digital assistant, web-enabled wireless telephone, or other processor-based device.

Turning to FIG. 1, a generalized architecture is presented including a central processing unit (1)("CPU"), which is typically comprised of a microprocessor (2) associated with one or more computer-readable storage devices such as random access memory ("RAM")(4), read-only memory ("ROM") (5), cache memory (3), FlashROM (6), and one or more storage drives (9). Such computer readable storage devices do not include propagation media for the purposes of this disclosure. The interface (7) between the microprocessor (2) and the various types of CPU memory is often referred to as a "local bus", but also may be a more generic or industry standard bus.

The one or more storage drives (9) may include hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be remotely accessible over a network.

Many computing platforms are provided with one or more communication interfaces (10), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement (IrDA) interface, too.

Computing platforms are often equipped with one or more internal expansion slots (11), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (12) allowing the user the ability to easily install and remove hardware expansion devices, such as PCMCIA cards, SmartMedia cards, and various proprietary modules such as removable hard drives, CD drives, and floppy drives.

Often, the storage drives (9), communication interfaces (10), internal expansion slots (11) and external expansion slots (12) are interconnected with the CPU (1) via a standard or industry open bus architecture (8), such as ISA, EISA, or PCI. In many cases, the bus (8) may be of a proprietary design.

A computing platform is usually provided with one or more user input devices, such as a keyboard or a keypad (16), and mouse or pointer device (17), and/or a touch-screen display (18). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (18) is usually provided, often with handwriting recognition capabilities.

Additionally, a microphone (19), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (100), such as a still digital camera or full motion video digital camera.

One or more user output devices, such as a display (13), are also provided with most computing platforms. The display (13) may take many forms, including a Cathode Ray Tube ("CRT"), a Thin Flat Transistor ("TFT") array, or a simple set of light emitting diodes ("LED") or liquid crystal display ("LCD") indicators.

One or more speakers (14) and/or annunciators (15) are often associated with computing platforms, too. The speakers (14) may be used to reproduce audio and music, such as the speaker of a wireless telephone or the speakers of a personal computer. Annunciators (15) may take the form of simple beep emitters or buzzers, commonly found on certain devices such as PDAs and PIMs.

These user input and output devices may be directly interconnected (8', 8") to the CPU (1) via a proprietary bus structure and/or interfaces, or they may be interconnected through one or more industry open buses such as ISA, EISA, PCI, etc. The computing platform is also provided with one or more software and firmware (101) programs to implement the desired functionality of the computing platforms.

Figure 2:
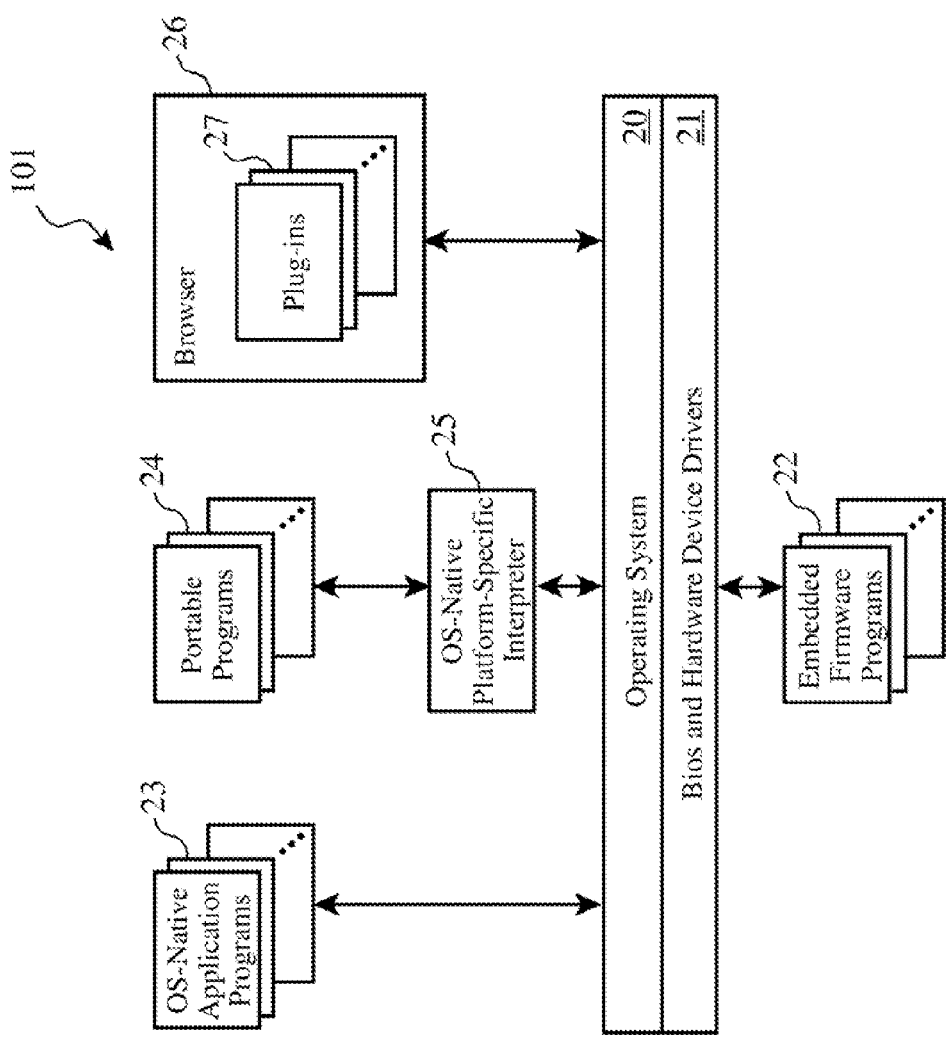
FIG. 2 shows a generalized organization of software and firmware associated with the generalized architecture of FIG. 1.

Turning to now FIG. 2, more detail is given of a generalized organization of software and firmware (101) on this range of computing platforms. One or more operating system ("OS") native application programs (23) may be provided on the computing platform, such as word processors, spreadsheets, contact management utilities, address book, calendar, email client, presentation, financial and bookkeeping programs.

Additionally, one or more "portable" or device-independent programs (24) may be provided, which must be interpreted by an OS-native platform-specific interpreter (25), such as Java™ scripts and programs.

Often, computing platforms are also provided with a form of web browser or micro-browser (26), which may also include one or more extensions to the browser such as browser plug-ins (27).

The computing device is often provided with an operating system (20), such as Microsoft Windows™, UNIX, IBM OS/2™, LINUX, MAC OS™ or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (21) are often provided to allow the operating system (20) and programs to interface to and control the specific hardware functions provided with the computing platform.

Additionally, one or more embedded firmware programs (22) are commonly provided with many computing platforms, which are executed by onboard or "embedded" microprocessors as part of the peripheral device, such as a micro controller or a hard drive, a communication processor, network interface card, or sound or graphics card.

As such, FIGS. 1 and 2 describe in a general sense the various hardware components, software and firmware programs of a wide variety of computing platforms, including but not limited to personal computers, PDAs, PIMs, web-enabled telephones, and other appliances such as WebTV™ and networked game console units.

We now turn our attention to disclosure of the present invention relative to the processes and methods preferably implemented as software and firmware on such a computing platform. It will be readily recognized by those skilled in the art that the following methods and processes may be alternatively realized as hardware functions or circuitry, in part or in whole, without departing from the spirit and scope of the invention.

Real-Time Messaging System Overview

Real-time messaging and "instant messaging" technologies are relatively new and the terminology for these technologies is evolving. Throughout this disclosure, we will refer to a real-time or instant message "thread" as a portion of conversation between two or more conversants that is tracked by real-time messaging tools by a defined beginning and ending. Further, we will refer to a real-time or instant messaging "conversation" as being analogous to a verbal conversation, including an exchange of sentiments, observations, opinions, or ideas, and a "transcript" as a traceable artifact that records either threads or conversations from historical point of view. Additionally, we will refer to a "break point" or "continuation point" as a point to divide conversations into different parts, wherein the concept of a break point is a mask, a tool that people use to help to organize their chain of thoughts or conversations. Conversations may be in a a particular state (e.g. happening, not happening, on-going, terminated, etc.). Additionally, "subjects", "topics", "dates", "authors", "senders", "recipients", and "conversants" are all "attributes" of conversations.

These attributes are linked together or associated via a conversation, such as a scenario in which a first user, Dan, can assign one or more break points to a particular conversation, wherein each conversation is stored in a transcript. This establishes a one-to-one relationship between the conversation and stored transcript. Break points can be thought of as sections of conversations. The first user, Dan, can resume a conversation having two break points with a second user, Boz, the transcripts of which can be displayed in two different windows, each window can have one or more topics.

Figure 3:
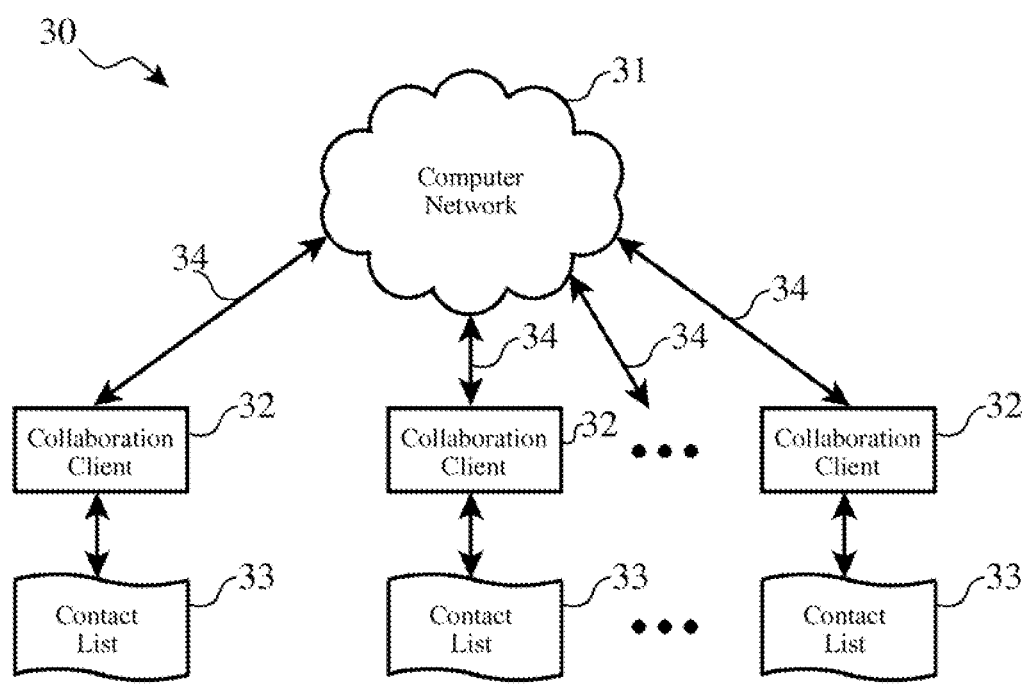
FIG. 3 shows a generalized view of system components for real-time collaboration, meeting and messaging systems as known in the art.

Turning to FIG. 3, a generalization (30) of the arrangement of components of real-time collaboration systems is shown. A number of collaboration clients (32) are interconnected (34) through a computer network (31). These collaboration clients typically comprise a personal computer equipped with software such as Netscape's Navigator™, AOL's Instant Messenger™, or Lotus' Sametime Connect™ client product. These collaboration clients (32) may also include other computing platforms such as personal digital assistants ("PDA") and advanced web-enabled wireless telephones.

The collaboration clients (32) may interface to the computer network (31) through a number of well-known technologies including, but not limited to, Transmission Control/Internet Protocol ("TCP/IP"), dial-up modems, cable modems, asymmetric digital subscriber line ("ADSL"), or other interface technologies such as wireless interfaces.

Typically, the collaboration client (32) maintains a local contact list (33), such as AOL Instant Messenger's "buddy list" or Netscape Navigator's "address book." These contact lists (33) may take the form of simple text files, or as advanced as database files. In some cases, the contact lists (33) are stored in proprietary formats.

When an online meeting or collaboration session is established, each new participant may supply the other participants with his or her email address as he or she logs into the session. The other participants may then chose to store that email address in their local contact list. In some cases, such as with the Instant Messenger product, there are other options for users to transmit their entire contact list to other meeting participants.

Figure 4:
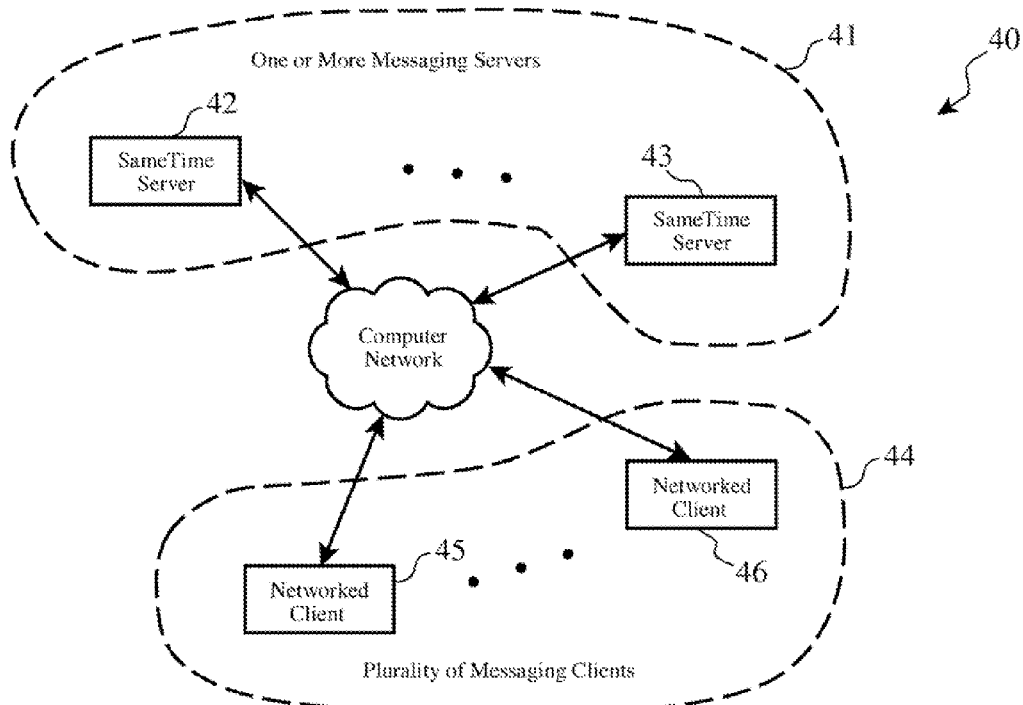
FIG. 4 illustrates a broader view of typical real-time collaboration systems, especially those based upon IBM Lotus' Sametime™ product line.

Turning to FIG. 4, a broader view of components and their intercommunications for real-time collaboration is shown (40). A plurality of messaging clients (44), including individual network clients (45, 46) such as cellular phones, PDAs, and personal computers, communicate via a common computer network, such as the Internet, local area network ("LAN"), or wide area network ("WAN"), to corresponding messaging servers (41, 42, 43).

Under most circumstances, message exchange is virtually "instant" and "immediate." The delay is rarely more than a few seconds, even during peak Internet usage periods. Thus, instant messaging requires quite a bit less storage for messages as they are not held for any considerable length of time by the messaging server(s).

Real-time messaging ("RTM") applications are generally categorized as either being public or enterprise. Public RTM applications allow anyone on the Internet to sign up, download the software and begin messaging. Microsoft .NET Messenger™, America Online's AIM™ and Yahoo Messenger!™ are examples of public IM software.

On the other hand, enterprise RTM services such as IBM Lotus' Instant Messaging and Web Conferencing, formerly called Sametime™, and Sun Microsystems' ONE Instant Messaging, are typically used within corporate environment. Access to an enterprise RTM server is typically restricted, and security precautions such as encryption are put in place to protect the enterprise network.

With all the different RTM applications available, most systems work similarly. Once the user launches the RTM application, the messaging client attempts to connect to the messaging server. Authentication occurs on the messaging server to verify information such as username and password. Once verification is successful, the client computer sends the server its network address, a port number that is assigned to the RTM service and the names of people from the user's contact list. The server creates a temporary session file that contains the connection information and checks the contact list to see if anyone else also logged onto the system.

Once the server finds the contacts who are online, it sends a message back to the client computer with its connection information and vice versa. The messaging client user interface displays the nicknames or names of the other online users from the contact list. When all connection information has been exchanged and acknowledged, an instant messaging session can begin. This connection process typically takes about ten seconds.

Figures 5, 7:
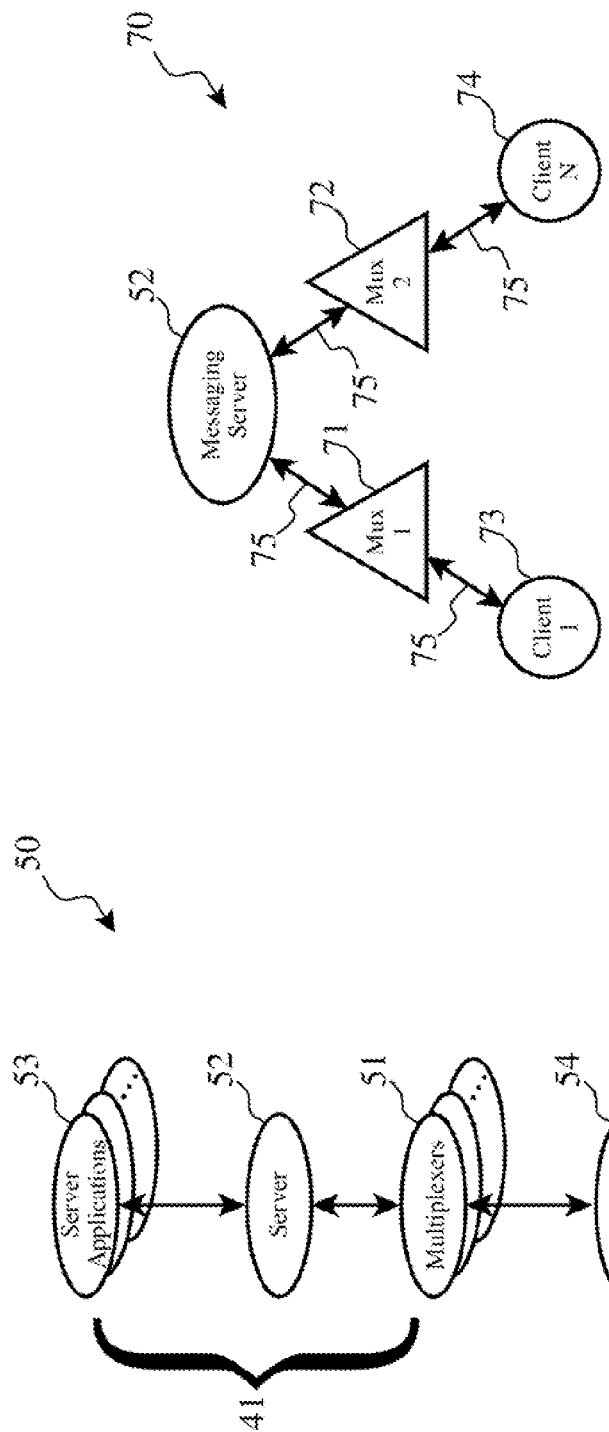
FIG. 5 depicts IBM's Sametime™ Server architecture structure.
FIG. 7 shows how conversations are established via channels for one messaging server.

Turning to FIG. 5, IBM's Sametime™ Server architecture (50) is shown. A community is defined as a collection of servers, either in distributed WAN or scalable LAN environment. The Clients (54) are the client-side programs that log into the community as a community user via the multiplexers (51), which mediate between the clients and a server. The messaging server (52) is the core server of the messaging community, and server applications (53) supply add-on services to the community.

Figure 6:
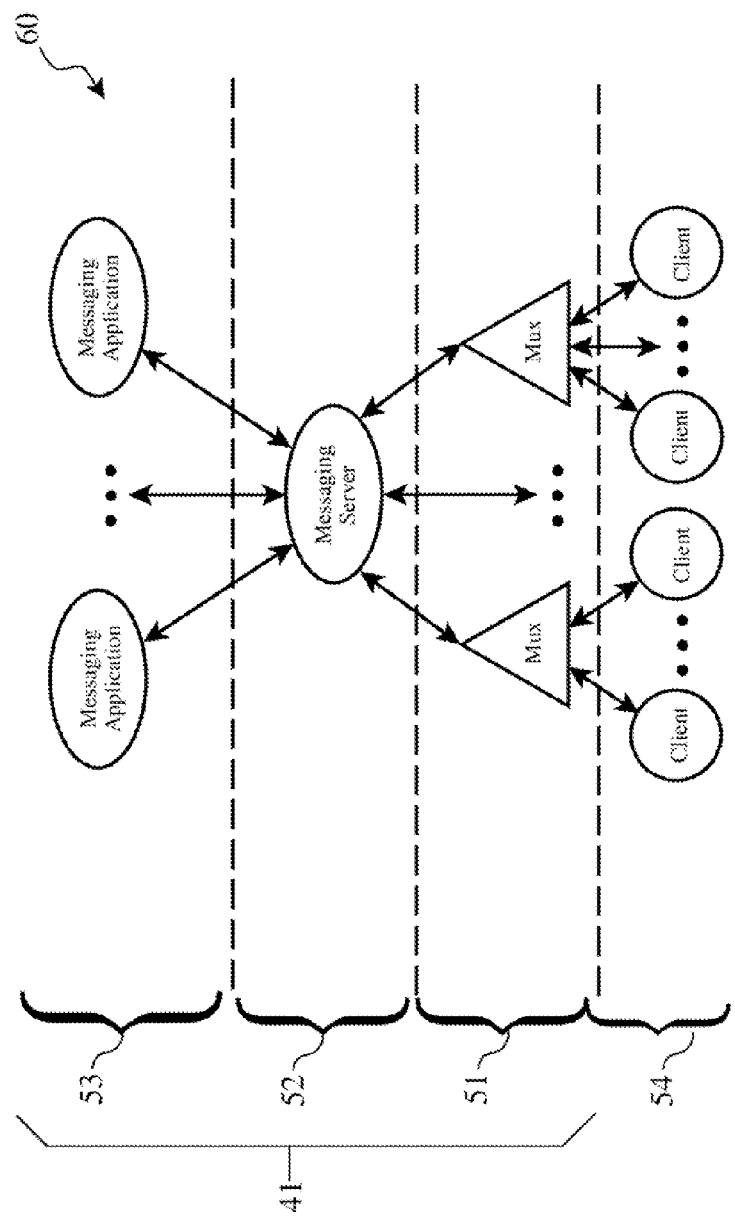
FIG. 6 shows IBM's Sametime™ community in a schematic view.

IBM's Sametime community schematic view (60) is depicted in FIG. 6. The clients (54) communicate via the Multiplexers (51). The multiplexers enable highly efficient and scalable operation through I/O concentration, distribution of multi-recipient messages, and performance of gateway functions. This concentration limits the I/O overhead of the server because the server is required to send and receive data on a small number of connections to the multiplexers. The server is able to send a single copy of a message with its recipient list attached to its multiplexer, and the multiplexer then distributes the message to the indicated recipients.

Because a multiplexer can act as a gateway, it is able to translate protocols between clients or third-party client software and Sametime™ server. For instance, an extended hypertext transfer protocol ("HTTP") multiplexer that allows clients to work with the Sametime community using the HTTP protocol acts as a security firewall and protocol converter so that a user can use a web browser as their client software into the Sametime system.

Thus, by acting as a gateway, the multiplexer can allow integration of different protocols while enabling the Sametime server to continue and use the Sametime optimized protocol. The multiplexer layer is transparent to the clients that connect to the messaging community through them. Multiplexers can connect in a multi-level fashion where a multiplexer is not directly connected to the server, but instead connects to another multiplexer in a chain of multiplexers. Layering can be used for localizing user connections and/or in a firewalled environment where the multiplexer acts as a proxy.

The messaging server (52) that is the core of the Sametime™ community is responsible for managing the community members such as users, logins, multiplexers and server applications, routing messages, and supplying notifications to its community members.

The messaging server applications (53) extend and customize the functionality supplied by the server. A server application connects to a server and declares the services it is supplying. The server routes requests for such services to the appropriate instance of the server applications. Some of the services supplied by native Sametime™ server applications include using buddy lists, authenticating of users to its servers, matching user name with user identifications, browsing and searching capability via a directory, and supplying chat rooms for user participation. Third-party vendors using the Server toolkit are able to develop other customized services. For example, a Sametime™ system deployed within an investment company's enterprise may provide for custom instant messaging functions including real-time stock quotes or economic data retrieval.

The diagram of FIG. 7 shows (70) how conversations are established via channels (75) between a messaging server (72) and two or more specific clients (73, 74, etc.). Channels are virtual connections that route messages. A channel may span several Transmission Control Protocol/Internet Protocol ("TCP/IP") connections. In this example, Client 1 (73) on Multiplexer 1 (71) initiates a message exchange which creates a channel (75) to a messaging server (52) that travels to the corresponding Multiplexer 2 (72) for Client 2 (74).

The network route between any community members may involve several "hops" between components. The channel ensures the order of messages is maintained during a conversation, and ensures connectivity by providing a notification when the route of the channel is broken (e.g., when a crash occurs on one of the parties or on one of the community members along the channel route). Both channel participants receive a notification when the channel is broken. Data that enables routing of channel messages is stored in each of the community entities of the channel route.

User Interface for Management and Resumption of Conversations

The functionality and underlying logical processes of the present invention are best understood by first considering the improved user interface which allows the user to invoke and interact with the invention.

Figure 9:
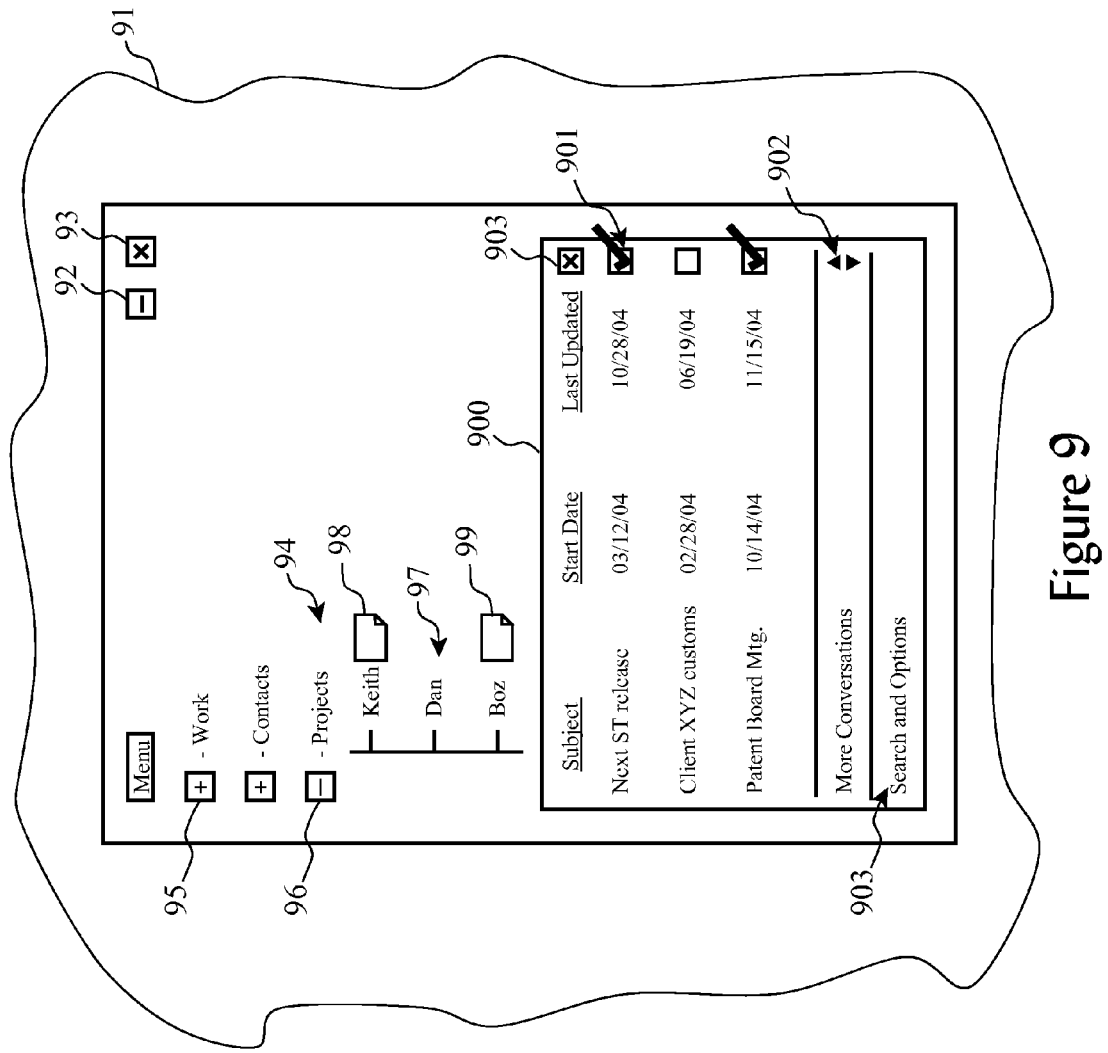
FIG. 9 shows an example user interface according to the present invention.

Turning to FIG. 9, a representative user interface is shown on a portion (91) of a client device's display in which a real-time messaging top menu frame is shown. Like existing user interfaces, the new user interface includes a minimize button (92), and a close or terminate client button (93), both of which are selectable by a user interface device such as a cursor, mouse, stylus, keyboard, etc., which perform known functions.

Further like the existing user interfaces for RTM clients, a hierarchical list (94) of organized subjects is shown, including user-selectable expand sublist buttons (95), and collapse sublist buttons (96), which either show more details of lower level lists or hide more the details of lower level lists, respectively. In this example, two subjects are shown collapsed, and a third subject "Projects" is shown expanded with three shown sub-items "Keith", "Dan" (97) and "Boz".

According to one aspect of the invention, an indicator such as an icon or button is added to the user interface next to or proximate to listed items which have stored transcripts of previously conducted real-time messaging conversations. In this example, the entry "Keith" shows a "note" icon (98, 99) having the appearance of a "sticky note", placed next to the "Keith" entry. This indicates to the user that there are some hidden ongoing chats. In one embodiment of the invention, the note icon also indicates the total number of active and/or archived hidden chats for that list entry. For example, if the user has 5 active hidden chats with Keith, then a number "5" would be displayed in the note icon (98). This icon provides a reminder to the user that a conversation has not been completed. Alternate icons and methods of selecting them are available for alternate embodiments, of course.

When users move the mouse over a note icon (99), a persistent conversation ("PC") pop-up window (900) is displayed which allows a user to search for and show (902, 903) a list of previously discussed conversations associated with that list entry. While the PC pop-up window (900) is displayed, a user can select a previous conversation and resume it any time. In this example user interface embodiment, check boxes (901) provide near or proximate to each listed transcript which, when selected, trigger the invention to recall or retrieve the selected transcript and begin appending entries to it, thereby resuming the previous conversation and restoring the context of the previous conversation. Likewise, the previous (e.g. old) entries of the recalled transcript(s) are also displayed in the messaging reader/writer window just as if they had recently been sent or received, so that the user can see the previous entries and can resume the conversation intelligently.

User Preferences

According to another aspect of the present invention, users can define how many conversations they'd like to show, save or archive. Users can define the breakpoints anywhere in the conversations, meaning managing threads in their own preferences. For example, a user can insert a break point in the middle of a conversation and archive the previous part of conversation. Another scenario is that a user can resume a conversation, type new information, save it in draft mode, then send out later when he/she is ready. [0078] Users can configure the invention to let it automatically show any number of most recent conversations or certain topics/key words, etc., save any number of previous conversations in the system, and archive conversations under certain rules (e.g. a number of inactive days).

Furthermore, users have the ability to insert break points as desired in order to declare that a given conversation entry is an ending of or resumption of a conversation. For example, in one available embodiment, users can either right-click, then choose from context menu, or press ctrl + a key to end a conversation, and/or start a new conversation.

Data Model of One Available Embodiment

Figure 8:
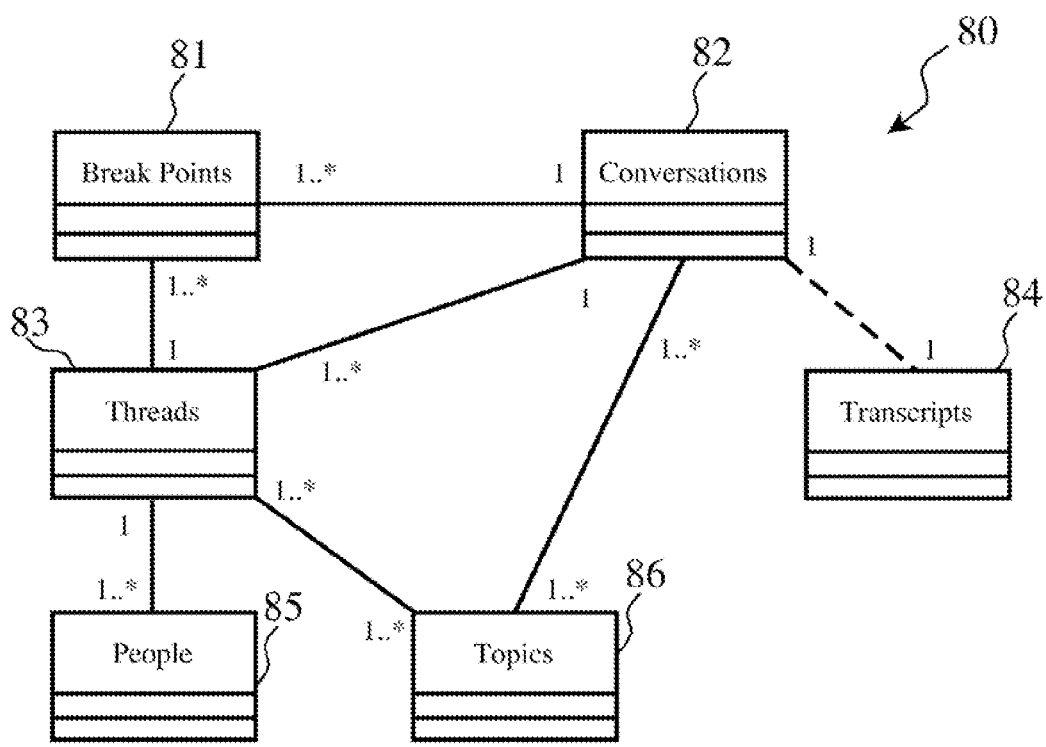
FIG. 8 sets forth a data model employed by the invention in one available embodiment.

Turning to FIG. 8, a Class Unified Modeling Language ("UML") class diagram (80) shows the logic data model for one embodiment of the present invention. This data model is an advance over threaded communication model by mapping entities to live communication including Conversations (82), Transcripts (84), Threads (83), Topics (86), People or participants (85), and Breakpoints (81). Threads may contain multiple break points, and typically include contributions from multiple people, and may pertain to one or more topics. Users can assign breakpoints as desired, as previously described and defined.

Logical Processes According to the Invention

The following logical processes according to the present invention may be realized in their entirety as server-based functions (e.g. programs, circuitry, etc.), in their entirety as client-based functions, or as a mixture of cooperating client and server functions. The ability of RTM servers to host and execute user-developed or user-provided applications provides the opportunity to implement the logical processes of the invention as a server application, and the ability to modify the software and functionality of RTM clients provides the opportunity to implement the invention's processes as client-side functions.

Figure 10:
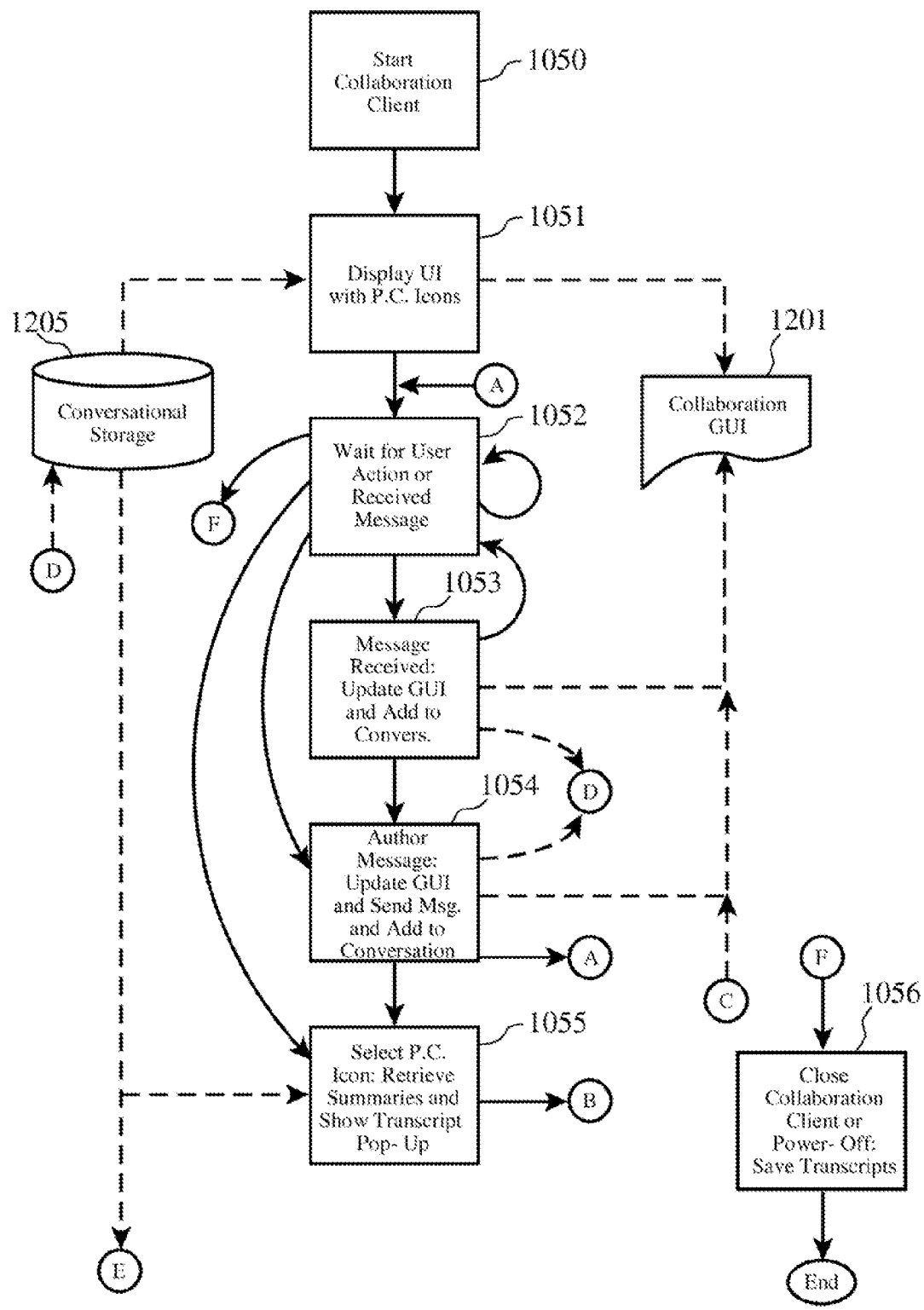
FIGS. 10 and 11 illustrate logical processes according to the present invention.

Turning to FIG. 10, a logical process according to the present invention is illustrated, wherein the instant messaging or real-time collaboration client is started, initiated or instantiated (1050), and an initial graphical user interface ("GUI") (1201) is displayed (1051) and populated, including accessing the conversation transcript storage (1205) to determine which entries in the GUI have persistent conversation transcripts. For those which do have PC transcripts, the note icon or other indicator of such is shown (1051) in the GUI (1201).

Figure 11:
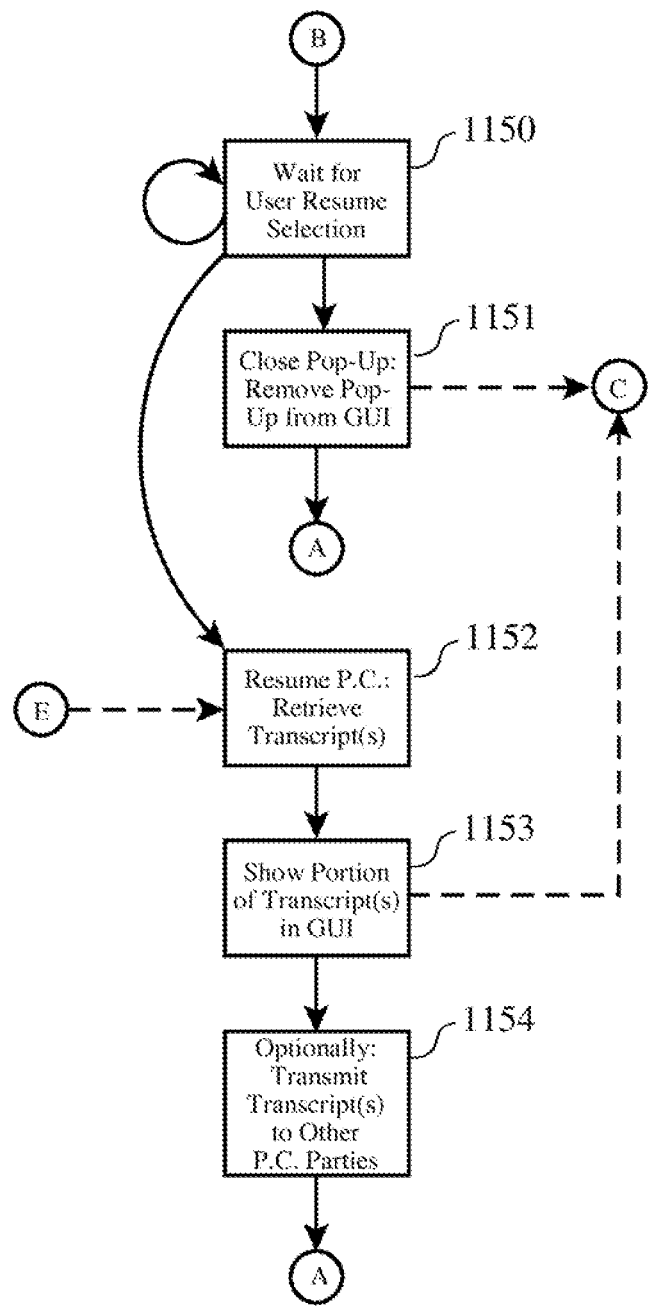

Next, the system awaits (1052) a user action or the receipt of a message directed to the user. If the user selects (1055) a PC note icon associated with a transcript listed in the GUI (1201), the associated transcript is retrieved from persistent conversation storage (1205), and the GUI is updated to show some or all of the previous entries in the transcript so that the user can regain a mental context of the conversation when it was last terminated or suspended. Then, the system returns to awaiting receipt of a message, or receiving a user action selection, as shown in FIG. 11 and discussed in more detail in the following paragraphs.

Still referring to FIG. 10, if a message is received (1053), then the GUI (1201) is updated appropriately to show the received message, and if a conversation has been resumed and the received message pertains to that message, the persistent transcript (1205) is appended to include the received message. Then, the system returns to awaiting receipt of another message or user action (1052).

If the user selects to author or write a new message (1053), this is performed normally allowing the user to type or write into the GUI (1201), and if the newly written message pertains to a resumed or on-going conversation, the appropriate persistent transcript (1205) is appended to include the newly written message. The newly written message is sent, and the system returns to awaiting a user action or receipt of a new message.

If the user selects to close the collaboration client (1056), or the system is otherwise shut down or terminated, the system saves in persistent memory the persistent conversation transcripts (1205) for use and access when the system is started again (1050).

Turning now to FIG. 11, when the user has selected (1105) a PC note to recall the context of a conversation related to a listed entry, the system displays in a pop-up menu a list of available conversations associated with the list entry (e.g. associated with the listed user, topic, etc.). The system waits for the user to select a conversation to resume (1152), following which the system retrieves the associated transcript from persistent conversation storage (1205), shows (1153) a portion of the transcript in the GUI (1201), and optionally transmits (1154) the selected transcript(s) to the other conversants, which is described in more detail in the following paragraphs. Then, the system returns to waiting (1150) for the user to select another conversation to resume, as the invention allows the user to resume multiple conversations simultaneously.

If the user closes the pop-up, such as selecting a close icon or clicking outside the pop-up menu, the pop-up menu is removed (1151) from the GUI (1201), and the system returns to waiting (1052) for user actions or receipt of messages.

Client-Side Implementation

As previously discussed, the logic of the present invention may include server-side applications, and the transcripts may be stored either by a server, or locally by each client device.

Figure 12:
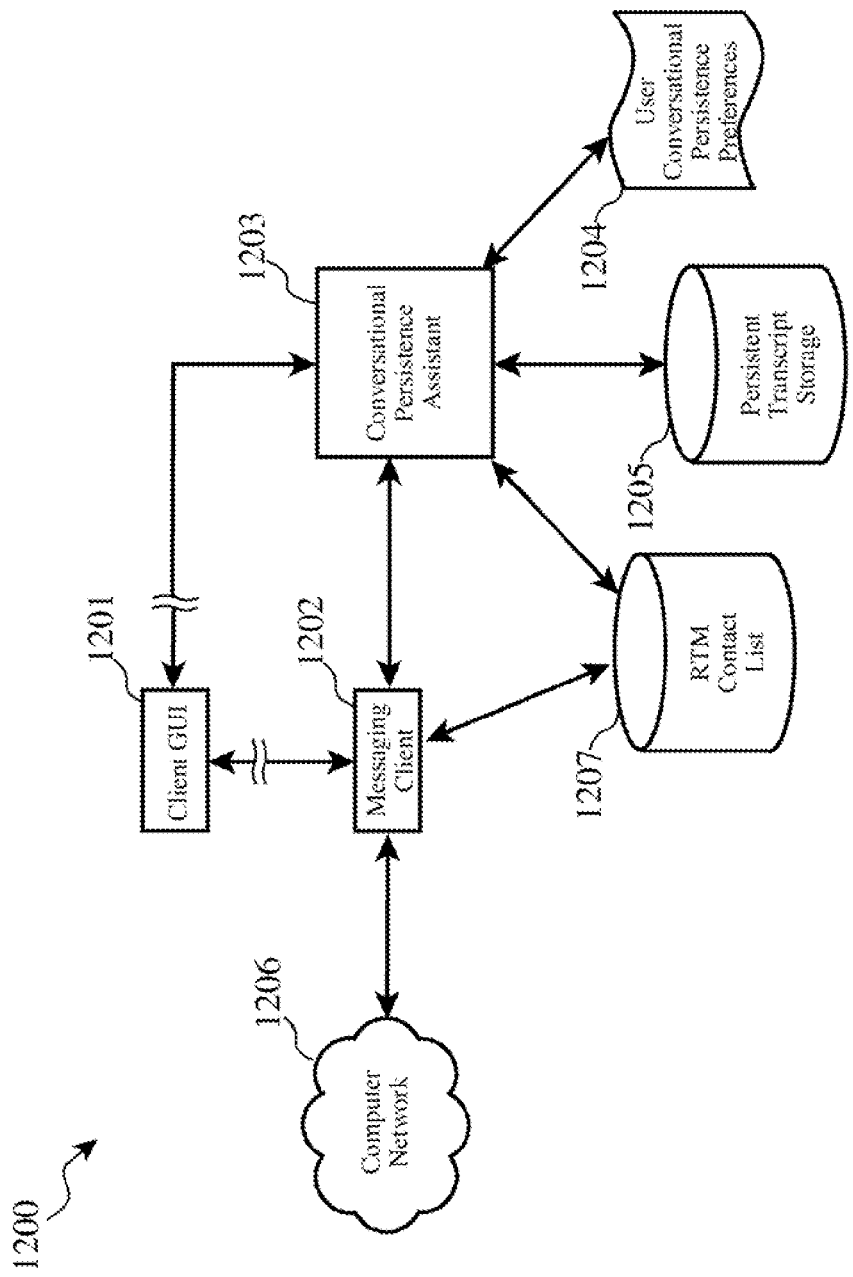
FIG. 12 depicts a functional organization of a client-side realization of the invention.

FIG. 12 shows details (1200) of such a client-side realization, wherein a messaging client (1202) communicates messages via a network (1206) and controls a client user interface (1201) normally, but is modified to incorporate or cooperate with a Persistent Conversation Assistant ("PCA") (1203).

The PCA stores or accesses stored transcripts (1205), and may access the messaging clients' contact list (1207). Additionally, the PCA accesses, and may assist in configuring the user's conversational persistence preferences (1204), as previously described.

Server-Side Implementation

Figure 13:
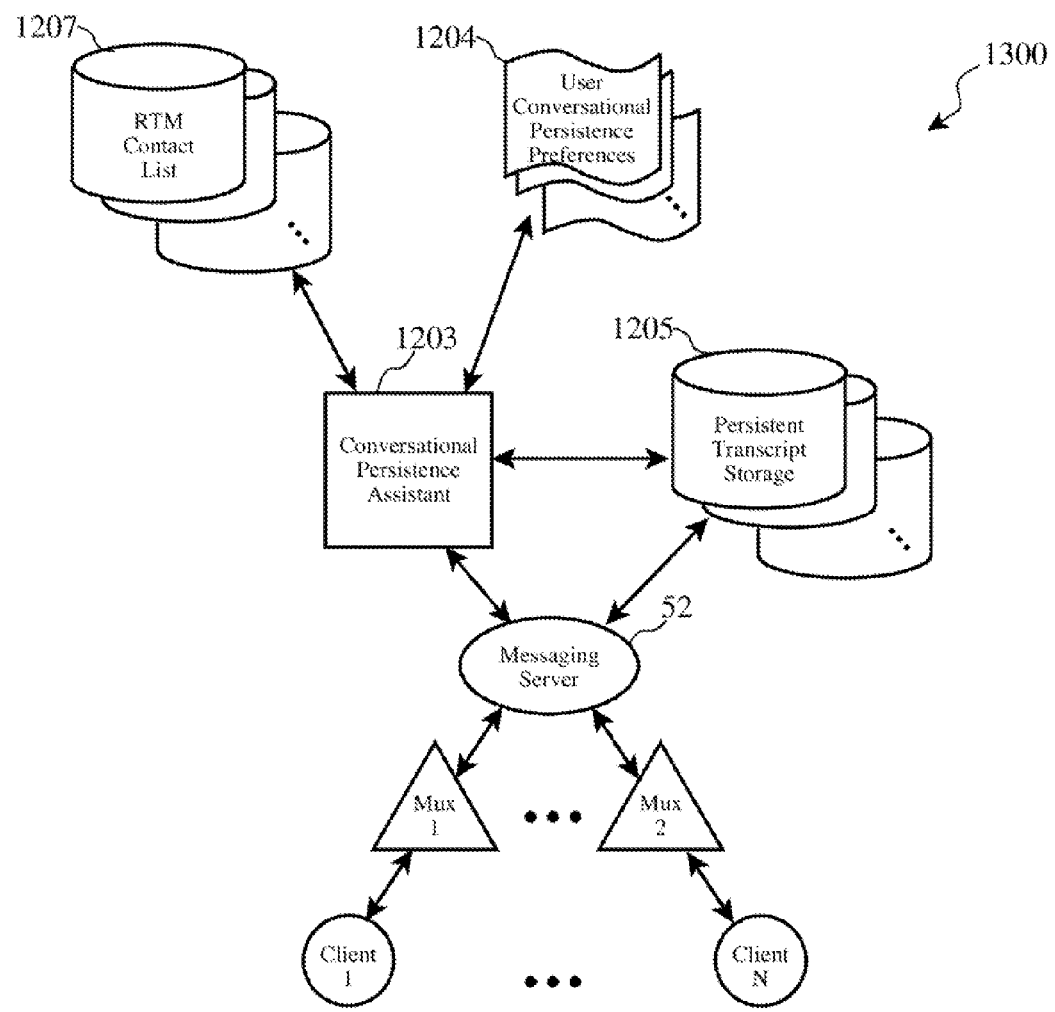
FIG. 13 depicts a functional organization of a server-side realization of the invention.

In another available embodiment (1300), part or all of the logical processes of the present invention are realized as server-side programs or circuits, as shown in FIG. 13. The messaging server is, in this embodiment, provided with one or more contact lists (1207) and a set of PCA preferences (1204) corresponding to the users of the client devices (73, 74, etc.). The PCA logical process can then access the preferences (1204), contact lists (1207), and persistent conversation transcripts (1205) for users, topics, sessions, etc., and can perform the same functions of the logical processes of the invention.

Models of Interaction and Variations of Embodiment

As described in the foregoing paragraphs, one available embodiment of the invention allows just a single user to retrieve and display the context of a previous discussion, while the other participants in the resumed conversation may not have the previous context displayed. The user may receive the context and previous transcript from a local data storage, or may be provided the transcript(s) from the messaging server.

However, optional embodiments of the present invention provide for other conversants in the resumed conversation to receive copies of the transcripts such that they may be mentally refreshed as to the context of the conversations, as well. As real-time and instant messaging becomes mainstream in communications, it may be highly useful in certain scenarios for this group context reminder. Consider, for example, a stock trader who is communicating with an investor about a potential stock trade. It would be useful for both the trader and the investor to continue the previous conversation in full view of the previous statements and entries.

A first optional embodiment for the invention to share persistent conversation transcripts is a peer-to-peer arrangement, wherein the messaging client which has the related transcript transmits it to the other messaging clients participating in the resumed conversation. This can be performed in a single, non-acknowledged transmission or distribution, or for applications where certainty of agreement is desired, it may be performed using a two-phase commitment process. In such a two-phase commitment process, the originating client would send to the other clients the transcript, followed by the other clients acknowledging and accepting the transcript (e.g. in effect, agreeing to the content of the distributed transcript).

In another variant of embodiments of the invention, the server may store the transcripts and then distribute them to all messaging clients who want to receive them, optionally using a one- or two-phase commit process, as well.

Conclusion

Using the present persistent conversation management invention, the following advantages are obtained over the existing real-time messaging systems and technologies:

(1) Valuable time and concentration energy are saved to solve the problem since users do not have to search various threads to recall where they have left. A single transcript provides all the information cross multiple threads related to a conversation. Users are brought up to speed and "warm up" immediately.

(2) Information is saved in a more centralized and logical fashion surrounding conversations. It is much easier to find and manage since it reflects how human metal processes work, whereas the existing thread-based saving mechanism reflects "computerized thinking".

(3) The invention provides a more semantically correct approach.

(4) Many enhanced functionalities to allow users to manage and organize information, tag extra meta data together with break points, send part of transcript to emails/IM/content management tools, and hide/delete them based on break points.

Many embodiment examples and details have been provided in this disclosure in order to assist the reader in understanding the invention. It will be readily recognized by those skilled in the art, though, that these examples and embodiment choices do not represent the scope of the invention, and that many implementation choices may be made other than those described, which fall within the spirit and scope of the present invention. Therefore, the scope of the invention should be determined by the following claims.

What is claimed is:

1. A method for managing a conversation including at least part of a first thread containing a beginning message, an ending message, and a plurality of intervening messages between the beginning message and the ending message, the method comprising the steps of:
   recording a point between two of the intervening messages within the first thread;
   copying a portion of the messages from the first thread into a second thread, wherein the portion is less than all of the messages of the first thread and is bounded by the point; and
   appending to the second thread messages which are not stored in the first thread, thereby continuing a conversation from the beginning message to the point with subsequent messages being recorded in the second thread after the point.

2. The method as set forth in claim 1 wherein at least one of the one or more processors is a component of a messaging server.

3. The method as set forth in claim 1 wherein at least one of the one or more processors is a component of a messaging client.

4. The method as set forth in claim 1 further comprising transmitting by a processor the first thread of messages to at least one destination selected from the group consisting of a messaging client and a messaging server.

5. The method as set forth in claim 1 further comprising searching by a processor a plurality of persistently stored threads for at least one user-indicated criteria, and retrieving the first thread from the plurality of stored and searched threads matching the at least one user-indicated criteria.

6. A computer program product for conversation including at least part of first thread containing a beginning message, an ending message, and a plurality of intervening messages between the beginning message and the ending message, the computer program product comprising:
   one or more computer-readable storage devices;
   first program instructions for recording a point between two of the intervening messages within the first thread;
   second program instructions for copying a portion of the messages from the first thread into a second thread, wherein the portion is less than all of the messages of the first thread and is bounded by the point; and
   third program instructions for appending to the second thread messages which are not stored in the first thread, thereby continuing a conversation from the beginning message to the point with subsequent messages being recorded in the second thread after the point;
   wherein the first, second, and third program instructions are stored on one or more of the computer-readable storage devices.

7. The computer program product as set forth in claim 6 further comprising fourth program instructions, stored on one or more computer-readable storage devices, for transmitting the first thread of messages to at least one destination selected from the group consisting of a messaging client and a messaging server.

8. The computer program product as set forth in claim 6 further comprising:
   fourth program instructions, stored on one or more computer-readable storage devices, for searching a plurality of persistently stored threads for at least one user-indicated criteria; and
   fifth program instructions, stored on one or more computer-readable storage devices, for retrieving the first thread from the plurality of stored and searched threads matching the at least one user-indicated criteria.

9. A system for managing a conversation including at least first thread containing a beginning message, an ending message, and a plurality of intervening messages between the beginning message and the ending message, the system comprising:
   one or more processors and one or more computer-readable storage devices;
   program instructions stored by the computer-readable storage device for execution by the processor for recording a point between two of the intervening messages within the first thread;
   program instructions stored by the computer-readable storage device for execution by the processor for copying a portion of the messages from the first thread into a second thread, wherein the portion is less than all of the messages of the first thread and is bounded by the point; and
   program instructions stored by the computer-readable storage device for execution by the processor for appending to the second thread messages which are not stored in the first thread, thereby continuing a conversation from the beginning message to the point with subsequent messages being recorded in the second thread after the point.

10. The computer system as set forth in claim 9 wherein at least one of the one or more processors is a component of a messaging server.

11. The computer system as set forth in claim 9 wherein at least one of the one or more processors is a component of a messaging client.

12. The computer system as set forth in claim 9 further comprising program instructions, stored on the computer-readable storage device for execution by the processor, for transmitting the first thread of messages to at least one destination selected from the group consisting of a messaging client and a messaging server.

13. The computer system as set forth in claim 9 further comprising:
   program instructions, stored on the storage device for execution by the processor for searching a plurality of persistently stored threads for at least one user-indicated criteria; and
   program instructions, stored on the storage device for execution by the processor for retrieving the first thread from the plurality of stored and searched threads matching the user-indicated criteria.

14. The method as set forth in claim 1 wherein the point is recorded responsive to one or more actions selected from the group consisting of a user designation of a point within the first thread, and automatic insertion of the point according to a user preference.

15. The method as set forth in claim 1 wherein the copied portion comprises a thread portion selected from the group consisting of the messages from the beginning message through to the point, messages from a first point to a second point in the first thread, and messages from the point to the ending message.

16. The computer program product as set forth in claim 6 wherein the program instructions for recording the point are responsive to one or more actions selected from the group consisting of a user designation of a point within the first thread, and automatic insertion of the point according to a user preference.

17. The computer program product as set forth in claim 6 wherein the program instructions for copying a portion comprises program instructions for copying a thread portion selected from the group consisting of the messages from the beginning message through to the point, messages from a first point to a second point in the first thread, and messages from the point to the ending message.

18. The system as set forth in claim 9 wherein the program instructions for recording the point are responsive to one or more actions selected from the group consisting of a user designation of a point within the first thread, and automatic insertion of the point according to a user preference.

19. The system as set forth in claim 9 wherein the program instructions for copying a portion comprises program instructions for copying a thread portion selected from the group consisting of the messages from the beginning message through to the point, messages from a first point to a second point in the first thread, and messages from the point to the ending message.

* * * * *